United States Patent [19]

Park

[11] Patent Number: 5,594,743
[45] Date of Patent: Jan. 14, 1997

[54] FIFO BUFFER SYSTEM HAVING AN ERROR DETECTION AND CORRECTION DEVICE

[75] Inventor: Yong-Gyu Park, Seoul, Rep. of Korea

[73] Assignee: Daewoo Electronics Co., Ltd., Seoul, Rep. of Korea

[21] Appl. No.: 336,606

[22] Filed: Nov. 9, 1994

[30] Foreign Application Priority Data

Nov. 29, 1993 [KR] Rep. of Korea ............. 1993-25674

[51] Int. Cl.[6] ................. G11C 29/00; G11C 11/34; H01J 1/00; H01J 5/06
[52] U.S. Cl. ................. 371/40.1; 371/40.4; 395/250; 365/189.05
[58] Field of Search ................. 371/40.1, 1, 40.4; 395/250, 425; 365/49, 189.01, 189.05; 369/59, 47–49

[56] References Cited

U.S. PATENT DOCUMENTS

| | | | |
|---|---|---|---|
| 4,357,702 | 11/1982 | Chase et al. ................. | 371/1 |
| 4,841,513 | 6/1989 | Farhangi et al. ................. | 369/59 |
| 5,325,487 | 6/1994 | Au et al. ................. | 395/250 |
| 5,371,870 | 12/1994 | Goodwin et al. ................. | 395/425 |
| 5,384,744 | 1/1995 | Lee ................. | 365/221 |

*Primary Examiner*—Roy N. Envall, Jr.
*Assistant Examiner*—Emmanuel L. Moise
*Attorney, Agent, or Firm*—Anderson, Kill & Olick P.C.

[57] ABSTRACT

A novel FIFO buffer system has an error detection and correction device for effectively detecting and correcting errors therein. The system comprises M number of data storage blocks arranged in parallel for temporarily storing N-bit input digital data and generating storage state signals including full flag and empty flag signals representative of the full and the empty states thereof; an error detector, responsive to the storage state signals, for generating full error signals and empty error signals representative of the errors present among the full flag signals and empty flag signals; and an error corrector, responsive to the full error and the empty error signals, for generating full error correction signals and empty error correction signals for correcting the erroneous storage state occurred in the corresponding data storage means thereto.

4 Claims, 4 Drawing Sheets

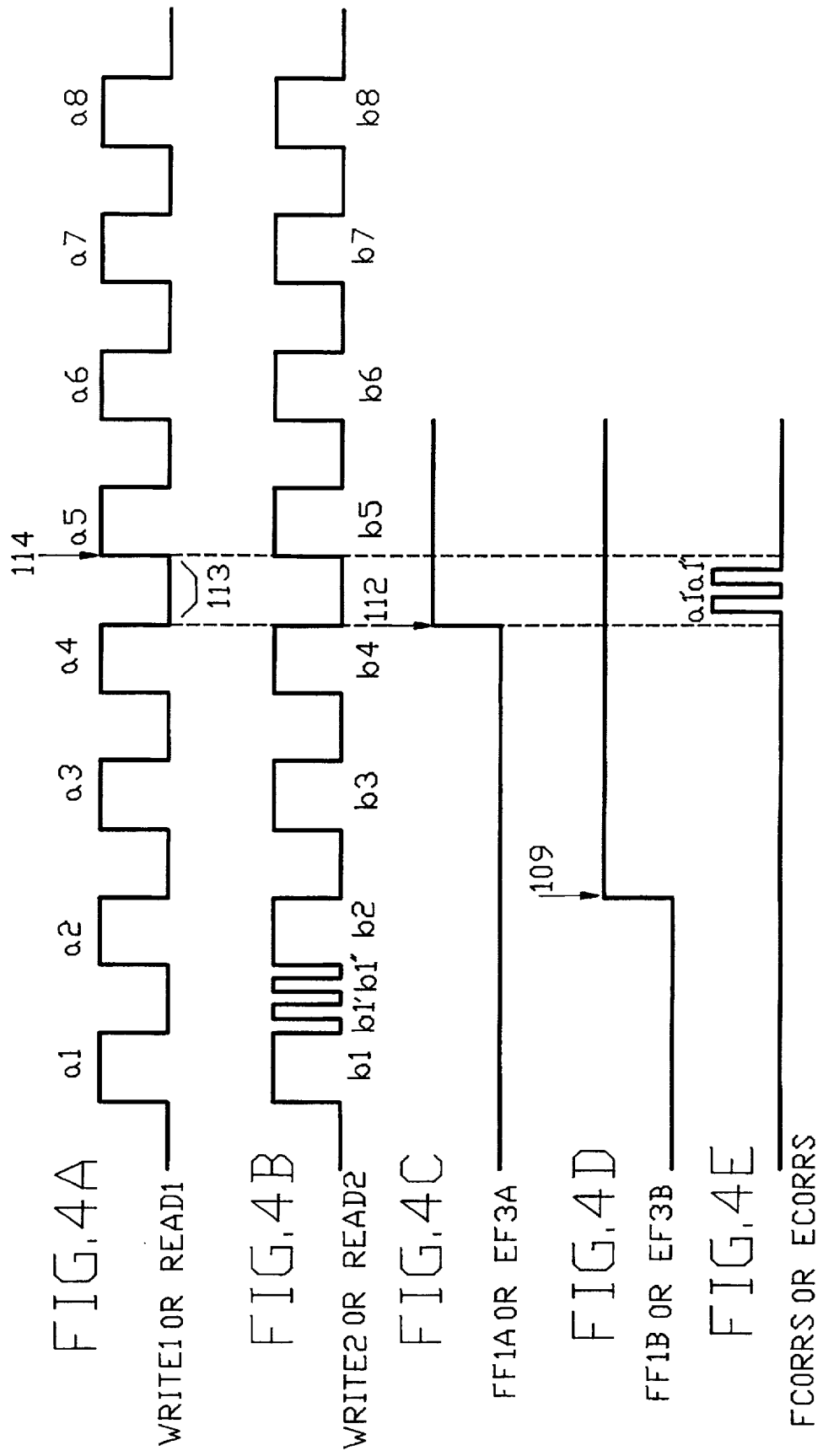

1

FIFO BUFFER SYSTEM HAVING AN ERROR DETECTION AND CORRECTION DEVICE

FIELD OF THE INVENTION

The present invention relates to a First-In-First-Out (FIFO) buffer system; and, more particularly, to an improved FIFO buffer system capable of detecting and correcting errors therein.

DESCRIPTION OF THE PRIOR ART

As is well known, a FIFO buffer system is widely utilized in various electronic/electrical applications. The conventional FIFO buffer system is provided with at least one FIFO buffer memory and is adapted for temporarily storing input digital data transmitted, e.g., in the form of discontinuous bit streams having varying or higher bit rates, which may be converted to a continuous bit stream having a lower constant bit rate.

The FIFO buffer memory is usually implemented by using a semiconductor integrated circuit and serves to store only the input digital data having a fixed bit width due to the limited hardware capacity. Therefore, the FIFO buffer system generally employs a plurality of FIFO buffer memories, each of which has an input bus having the fixed bit width, in order to process input digital data having a greater bit width than that of a FIFO buffer memory. In such a case, the FIFO buffer memories are arranged in a parallel fashion in order to enable the FIFO buffer memories to simultaneously process divided input digital data.

As is well known, in such an arrangement, it is required that the divided input digital data be simultaneously or synchronously stored(or written) into the parallel FIFO buffer memories, and outputted(or read) therefrom in the same manner so as to produce output digital data which is identical to the input digital data.

Sometimes, however, there occurs an asynchronism during a read or write operation for the FIFO buffer memories due to such noises as glitches or spikes present in a read or write control signal, thereby entailing erroneous output digital data.

SUMMARY OF THE INVENTION

It is, therefore, a primary object of the invention to provide an improved FIFO buffer system having the capability of effectively detecting and correcting an error which may be present in the buffer system.

In accordance with the invention, there is provided a FIFO buffer system, capable of storing N-bit input digital data, for producing N-bit output digital data having a constant bit rate, N being a multiple of M with M being a positive integer, which comprises: M number of data storage means arranged in parallel for temporarily storing the N-bit input digital data and producing the N-bit output digital data in synchronization, each of said data storage means synchronously storing (N/M)-bit input digital data and including two or more cascaded FIFO buffer memories for sequentially storing the (N/M)-bit input digital data, and each of the FIFO buffer memories generating storage state signals including a full flag and an empty flag signals representative of the full and the empty states thereof, respectively; error detection means, responsive to the storage state signals, for generating full error signals and empty error signals representative of errors present among the full flag signals and empty flag signals, respectively; and error correction means, responsive to the full error and the empty error signals, for generating full error correction signals and empty error correction signals for correcting the erroneous storage states occurred in the data storage means corresponding to the full error and the empty error signals, respectively.

BRIEF DESCRIPTION OF THE DRAWINGS

The above and other objects and features of the present invention will become apparent from the following description of preferred embodiments taken in conjunction with the accompanying drawings, in which:

FIGS. 4A to 4E offer a timing diagram generated from the respective elements shown in FIG. 1.

DETAILED DESCRIPTION OF THE PREFERRED EMBODIMENTS

Figure 1:
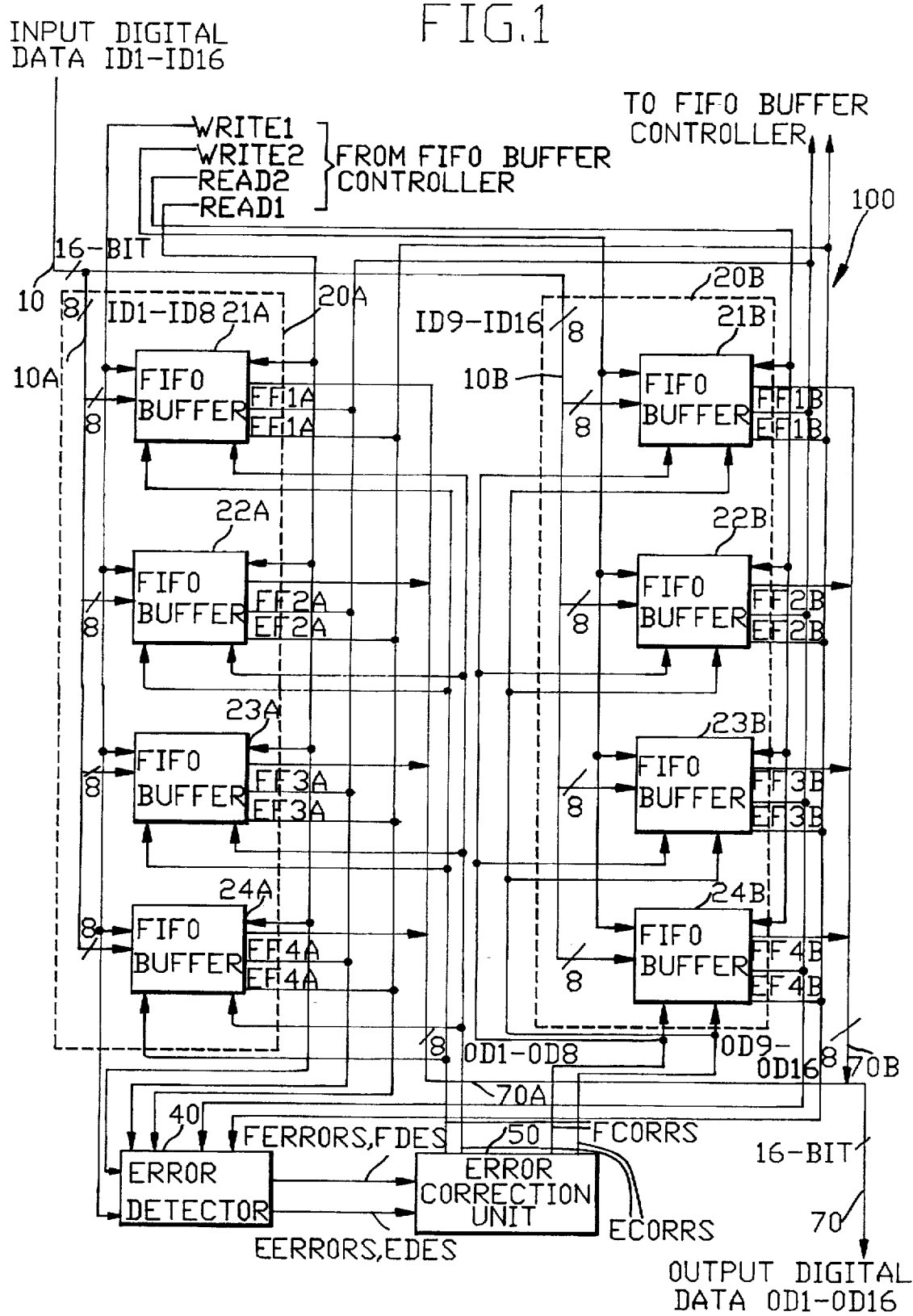
FIG. 1 shows a schematic diagram of a novel FIFO buffer system having an error detector and an error correction unit in accordance with the present invention.

Referring to FIG. 1, there is shown an inventive FIFO buffer system 100 having an error detector 40 and an error correction unit 50 in accordance with the present invention.

The FIFO buffer system 100 comprises first and second external buses 10 and 70, first and second data storage modules 20A and 20B, the error detector 40 and the error correction unit 50.

In the FIFO buffer system 100, the first external bus 10, which is adapted to transfer N, e.g., 16, bit input digital data, e.g., ID1 to ID16, in parallel, is coupled with internal input buses 10A and 10B. The second external bus 70, which is also exemplarily shown to transfer 16-bit output digital data, i.e., OD1 to OD16, in a parallel fashion, is connected with internal output buses 70A and 70B.

In accordance with a preferred embodiment of the present invention, each of the first and second data storage modules 20A and 20B includes L, e.g., 4, conventional FIFO buffers, which are coupled in a cascade manner. That is, each of the data storage modules includes four cascaded FIFO buffers which sequentially perform a write or read operation.

It should be noted that the number of FIFO buffers included in each of the data storage modules is determined based on the storage capacity of each of the FIFO buffers and the bit rate differences between the input and the output digital data.

As shown in FIG. 1, the internal input buses 10A and 10B, which are coupled to an input stage of each of the FIFO buffers 21A to 24A and 21B to 24B, transfer N/2, e.g., 8, bit input digital data, e.g., (ID1-ID8) and (ID9-ID16), respectively, in a parallel form, wherein N is a positive integer. The function of the internal output buses 70A and 70B is substantially identical to that of the internal input buses 10A and 10B excepting that each of the internal output buses is connected to an output stage of each of the FIFO buffers.

Each of the divided 8-bit input digital data, i.e., (ID1–ID8) and (ID9–ID16), on the internal input buses 10A and 10B is applied to the first and second data storage modules 20A and 20B, each of which simultaneously performs the write operation of the 8-bit input digital data. In a similar manner, each of the 8-bit output digital data, i.e., (OD1–OD8) and (OD9–OD16), is simultaneously read from each of the data storage modules.

Each of the FIFO buffers provides a FIFO buffer controller(not shown) and the error detector 40 with such a buffer state signal as a full flag or empty flag signal, e.g., FF1A or EF1A, indicating whether the buffer is full or empty, respectively. The FIFO buffer controller determines WRITE1 and WRITE2 control signals for controlling the write operation of the first and second data storage modules 20A and 20B, respectively, in response to the full flag signals from the modules 20A and 20B; and READ1 and READ2 control signals for controlling the read operation of the first and second data storage modules 20A and 20B, respectively, in response to the empty flag signals from the modules 20A and 20B; and provides them to the FIFO buffers, the error detector 40 and the error correction unit 50. It should be noted that even though write control signals for controlling the data storage modules 20A and 20B are referred to as the WRITE1 and WRITE2 control signals, respectively, they are identical; and the same holds true for the case of READ1 and READ2 control signals as well.

Specifically, each of the divided 8-bit input digital signals, i.e., (ID1–ID8) and (ID9–ID16), on the internal input buses 10A and 10B is simultaneously written onto first cascaded FIFO buffers 21A and 21B, respectively, in response to the WRITE1 and WRITE2 control signals issued by the FIFO buffer controller, respectively. Once the first cascaded FIFO buffers 21A and 21B are filled, the write operation is shifted to the second cascaded FIFO buffers 22A and 22B. This process is sequentially repeated for subsequent cascaded FIFO buffers.

Read operation is also performed in a similar manner as the write operation. That is, the divided 8-bit input digital data stored in the data storage modules is read simultaneously as 8-bit output data from the first cascaded FIFO buffers and sequentially through the next cascaded FIFO buffers. Each of the 8-bit output data on each of the internal output buses 70A and 70B is then combined at the second external bus 70 to thereby generate 16-bit output data in the form of, e.g., a continuous bit stream having a constant bit rate.

It should be noted that the write operation is carried out on completely emptied FIFO buffers, whereas the read operation is performed on completely filled FIFO buffers. Therefore, if the write or read operation is not carried out synchronously on the ith cascaded FIFO buffers(i=1, 2, 3, 4), the empty flag or full flag signals from the ith cascaded FIFO buffers will not be identical, which would mean an erroneous operation of the FIFO buffer system 100.

In the meanwhile, the error detector 40 generates full and empty error signals FERRORS and EERRORS representative of the respective errors by comparing the full flag signals and the empty flag signals from each of the ith cascaded FIFO buffers with a write, i.e., WRITE1 or WRITE2, control signal and a read, i.e., READ1 or READ2, control signal from the FIFO buffer controller, respectively. Details of the error detector 40 will be described with reference to FIG. 2.

The generated full and empty error signals are applied to the error correction unit 50 which serves to produce full error correction signals FCORRS in response to the full error signals and the write control signal and produce empty error correction signals ECORRS in response to the empty error signals and the read control signal. Details of the error correction unit 50 will be described hereinafter with reference to FIG. 3.

Figure 2:
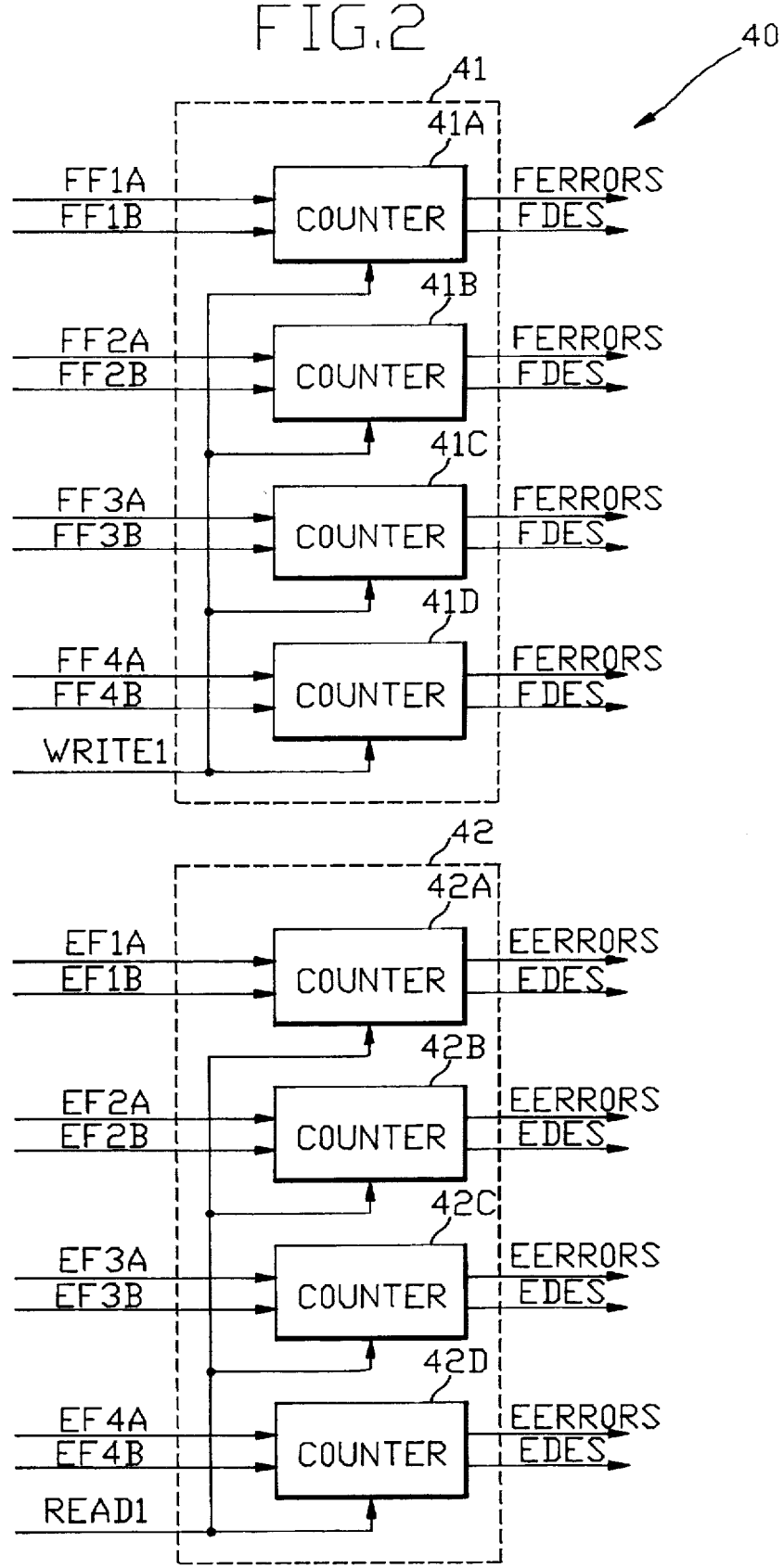
FIG. 2 depicts a detailed block diagram of the error detector shown in FIG. 1.

Referring to FIG. 2, there is shown a detailed block diagram of the error detector 40 shown in FIG. 1. The error detector 40 comprises first and second error detection circuits 41 and 42, wherein the first and second error detection circuits include a plurality of counters, e.g., 41A to 41D and 42A to 42D, respectively.

Inputs to each of the counters in the first and second error detection circuits 41 and 42 are full flag signals and a write control signal, e.g., WRITE1, or empty flag signals and a read control signal, e.g., READ1. For instance, inputs to the counter 41A are full flag signals FF1A and FF1B, which are provided from the first cascaded FIFO buffers 21A and 21B and the WRITE1 control signal fed from the FIFO buffer controller; and inputs to the counter 42C are empty flag signals EF3A and EF3B supplied from the third cascaded FIFO buffers 23A and 23B and the READ1 control signal from the FIFO buffer controller, and so on.

Each of the counters generates, as the full or empty error signal, a counted value 0 if the inputs thereto are identical. That is, the output from each of the counters will be the counted value 0 if the two inputs, e.g., EF3A and EF3B, thereto occur in synchronization. If the two inputs thereto do not synchronously occur, each of the counters provides a certain non-zero counted value by using WRITE1 or READ1 control signal as a clock signal. In other words, the counted values can be determined based on the clock intervals between the full or empty flag signals.

For instance, the counter 41A will generate a counted value 2 as the full error signal FERRORS if the onset of the full flag signal FF1B precedes the onset of the full flag signal FF1A by two clock intervals; and, similarly, the counter 42C will produce a counted value 2 as the empty error signal EERRORS if the onset of the empty flag signal EF3B precedes the onset of the empty flag signal EF3A by two clock intervals, as illustrated in FIGS. 4A to 4D.

Also, each of the counters, e.g., the counter 41A or 42C, provides the error correction unit 50 with a designation signal, e.g., a full designation signal FDES or an empty designation signal EDES indicating a data storage module, e.g., 20A, including therein the FIFO buffer filled up or emptied last.

Figure 3:
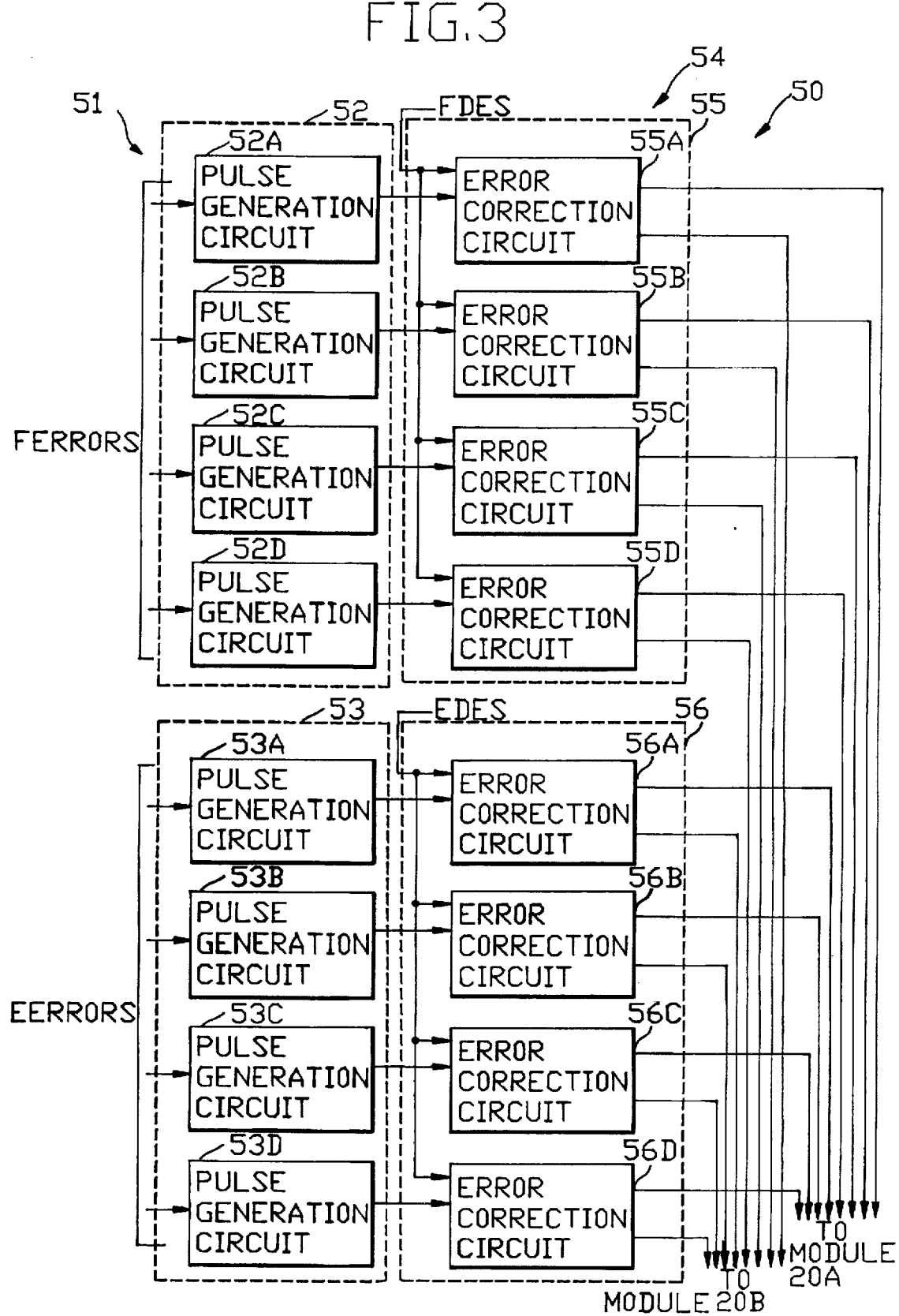
FIG. 3 illustrates a detailed block diagram of the error correction unit shown in FIG. 1.

Referring now to FIG. 3, there is shown a detailed block diagram of the error correction unit 50 shown in FIG. 1. The error correction unit 50 comprises a pulse generator 51 and an error corrector 54. The pulse generator 51 includes first and second pulse generation devices 52 and 53 wherein the first and second pulse generation devices include four conventional pulse generation circuits 52A to 52D and 53A to 53D, respectively.

Each of the pulse generation circuits 52A to 52D and 53A to 53D receives the full or empty error signal, FERRORS or EERRORS, provided from each of the counters 41A to 41D and 42A to 42D shown in FIG. 2 and generates a pulse signal having a number of pulses corresponding to the counted value inputted thereto. For instance, the pulse generation circuit 52A generates a pulse signal which includes two pulses if it receives the counted value 2 fed from its corresponding counter 41A. In a preferred embodiment of the invention, the pulse width is sufficiently small for the pulse generation circuit to provide a required number of pulses within a half clock interval.

Each of the generated pulse signals is applied to the error corrector 54. The error corrector 54 includes first and second error correction devices 55 and 56 wherein the first and second error correction devices include four error correction circuits 55A to 55D and 56A to 56D, respectively. Each of the error correction circuits receives a pulse signal from each of the pulse generation circuits and the full or empty designation signal FDES or EDES from a corresponding counter shown in FIG. 2; and provides the received pulse signal as the full or empty error correction signal, i.e., FCORRS or ECORRS, to a data storage module which includes therein the FIFO buffer filled up or emptied last, thereby correcting the erroneous data storage state occurred due to an asynchonous write or read operation.

Referring now to FIGS. 4A to 4E, details of the operation carried out by the error detector 40 and the error correction unit 50 shown in FIG. 1 will be described. As shown in FIGS. 4A and 4B, each of the write and read control signals consists of a sequence of logic low/high levels; and it is assumed that the write and read operations are performed during the logic high levels, e.g., a1 to a8 and b1 to b8. It should be noted that the write and read control signals are not drawn in actual scales. That is, even though write and read control signals are drawn in a same scale for the sake of simplicity in FIGS. 4A and 4B, the actual frequency of the logic high levels of the write control signal is greater than that of the read control signal, which can be inferred from the fact that the bit rate of the input digital data into the system is greater than that of the output digital data from the system.

In case logic high level noises, e.g., b1' and b1", occur in a logic low level of the WRITE2 control signal, e.g., between logic high levels b1 and b2 as shown in FIG. 4B, during the write operation on the ith FIFO buffers, e.g., 21A and 21B, and if the FIFO buffer 21B is completely filled under the logic high level b2, the FIFO buffer 21B generates the logic high full flag signal FF1B at an instance 109 as shown in FIG. 4D and continuously performs the write operation on the subsequent FIFO buffer 22B. In the meanwhile, the FIFO buffer 21A carries out the write operation under the logic high levels a3 and a4 of the WRITE1 control signal and gets completely filled upon the occurrence of a4 to thereby generate the logic high full flag signal FF1A at a time 112, as shown in FIG. 4C, which is delayed by two clock intervals from the onset of the full flag signal FF1B. By the time of 112 when the full flag signal FF1A occurs, two sets of the input digital data have been already stored in the first two storage areas of the FIFO buffer 22B with the logic high levels b3 and b4. It should be noted that two sets of error data are written onto the FIFO buffer 21A by b1' and b1" and that the write operation on the data storage modules 20A and 20B gets asynchronous after the occurrence of b1' in the sense that each pair of the N/2 bit input digital data is not stored at the identical storage areas in the data storage modules 20A and 20B. In such an instance, the input digital data stored after the occurrence of b1' cannot be read synchronously during the read operation. In other words, the original input digital data cannot be reconstructed by the read operation and the output digital data generated from the input digital data stored after the occurrence of b1' becomes all erroneous.

Accordingly, in accordance with the present invention, the error detector 40 shown in FIG. 1 counts the clock intervals by using the write control signal as a reference; and generates the counted value, e.g., 2 in this case, as the full error signal FERRORS and the full designation signal FDES indicating the data storage module 20A. Thereafter, in response to the full error signal FERRORS, the pulse generation circuit 52A included in the error correction unit 50 generates the pulse signal including pulses a1' and a1" as shown in FIG. 4E for the duration of a logic low level 113 between the logic high levels a4 and a5 shown in FIG. 4A.

Subsequently, in response to the full destination signal FDES from the error detector 40, the error correction circuit 55A provides the pulse signal from the pulse generation circuit 52A as the full correction signal FCORRS to the data storage module 20A. By the application of the full correction signal FCORRS to the data storage module 20A prior to the occurrence of the logic high levels a5 and b5 in the WRITE1 and WRITE2 control signals, two sets of data, e.g., having all zero values, are stored at the first two storage areas in the FIFO buffer 22A. Since two sets of input digital data have been stored at the first two storage areas in the FIFO buffer 22B under the logic high levels b3 and b4, subsequent input digital data can be stored at the identical storage areas in the FIFO buffer 22A and 22B in response to the WRITE1 and WRITE2 control signals, thereby enabling a synchronous read operation to be performed thereon.

Correction of errors occurred by an erroneous read operation is carried out in a similar manner. For instance, if noises b1' and b1" are induced during the read operation on the FIFO buffer 23B as shown in FIG. 4B, the onset of the empty flag signal EF3B from the FIFO buffer 23B precedes the onset of the empty flag signal EF3A from the FIFO buffer 23A by two clock intervals; and the output digital data read after the occurrence of b1' becomes all erroneous. In response to EF3A, EF3B, and the read control signal, the counter 42C included in the error detector 40 generates the empty error signal EERRORS having the counted value 2 and the error designation signal EDES representing the data storage module 20A. The pulse generation circuit 53C included in the error correction unit 50 generates, in response to the empty error signal EERRORS, the pulse signal having pulses a1' and a1" as shown in FIG. 4E within the duration of the logic low level 113 shown in FIGS. 4A and 4B. The pulse signal from the pulse generation circuit 53C is provided as the error correction signal ECORRS by the error correction circuit 56C to the data storage module 20A in response to the error designation signal EDES from the counter 42C. Since the input digital data stored in the first two storage areas of the FIFO buffer 24B has been read under the logic high levels b3 and b4 of the READ2 control signal and the input digital data stored in the first two storage areas of the FIFO buffer 24A is read by the pulses a1' and a1" prior to the onset of the logic high level a5, subsequent read operation on the data storage modules 20A and 20B can be performed simultaneously without causing errors to the output digital data.

Although the preferred embodiment of the instant invention has been described with reference to two data storage modules for the sake of simplicity, it should be appreciated that more than two data storage modules can be employed in order to accommodate input digital data having a greater bit width than that of the input digital data described hereinabove.

While the present invention has been shown and described with reference to the particular embodiments, it will be apparent to those skilled in the art that many changes and modifications may be made without departing from the spirit and scope of the invention as defined in the appended claims.

What is claimed is:

1. A FIFO(First-In-First-Out) buffer system, capable of storing N-bit input digital data, for producing N-bit output digital data having a constant bit rate, N being a multiple of M with M being a positive integer, wherein the FIFO buffer system includes a buffer controller which generates a write control signal and a read control signal, the write and the read control signals consisting of a sequence of write enable and read enable signals, respectively, said FIFO buffer system comprising:

M number of data storage modules arranged in parallel for temporarily storing the N-bit input digital data in response to the write control signal and producing the N-bit output digital data in response to the read control signal, wherein each data storage module includes two or more cascaded FIFO buffers for sequentially storing (N/M)-bit input digital data and producing (N/M)-bit output digital data, each FIFO buffer generating a full flag and an empty flag signals when it becomes completely full and empty, respectively;

error detection means, in response to full flag signals and the write control signal, for detecting an onset of a full flag signal from an ith FIFO buffer included in each of the M number of data storage modules and generating a write designation signal and a write error signal for each of the M number of data storage modules, wherein the write designation signal indicates a data storage module which includes said each of the M number of ith FIFO buffers and the write error signal represents an offset between the onset of the full flag signal from said ith FIFO buffer and an earliest of all onsets of full flag signals from all the M number of ith FIFO buffers, the offset being expressed in terms of the number of write enable signals therebetween; and error correction means, responsive to the write error signal and the write designation signal, for generating a state error correction signal to each of the M number of data storage modules to thereby compensate for the offset.

2. The system as recited in claim 1, wherein each of said write enable signals is of a pulse form and said error correction means includes:

write pulse generation means, responsive to the write error signal, for generating a corresponding number of write pulses to said number of write enable signals representing the write error signal; and write error compensation means, responsive to the write designation signal, for providing the write pulses to a data storage module corresponding to the write designation signal.

3. The system as recited in claim 2, wherein i) said error detection means further includes:
    means, in response to empty flag signals and the read control signal, for detecting an onset of an empty flag signal from an ith FIFO buffer included in each of the M number of data storage modules and generating a read designation signal and a read error signal for each of the M number of data storage modules, wherein the read designation signal indicates a data storage module which includes said each of the M number of ith FIFO buffers and the read error signal represents an offset between the onset of the empty flag signal from said ith FIFO buffer and an earliest of all onsets of empty flag signals from all the M number of ith FIFO buffers, the offset being expressed in terms of the number of read enable signals therebetween;

ii) each of said read enable signals is of a pulse form; and iii) said error correction means further includes:
    read pulse generation means, responsive to the read error signal, for generating a corresponding number of read pulses to said number of read enable signals representing the read error signal; and
    read error compensation means, responsive to the read designation signal, for providing the read pulses to a data storage module corresponding to the read designation signal.

4. The system as recited in claim 3, wherein N and M are 16 and 2, respectively.

* * * * *